United States Patent Office 3,296,861
Patented Jan. 10, 1967

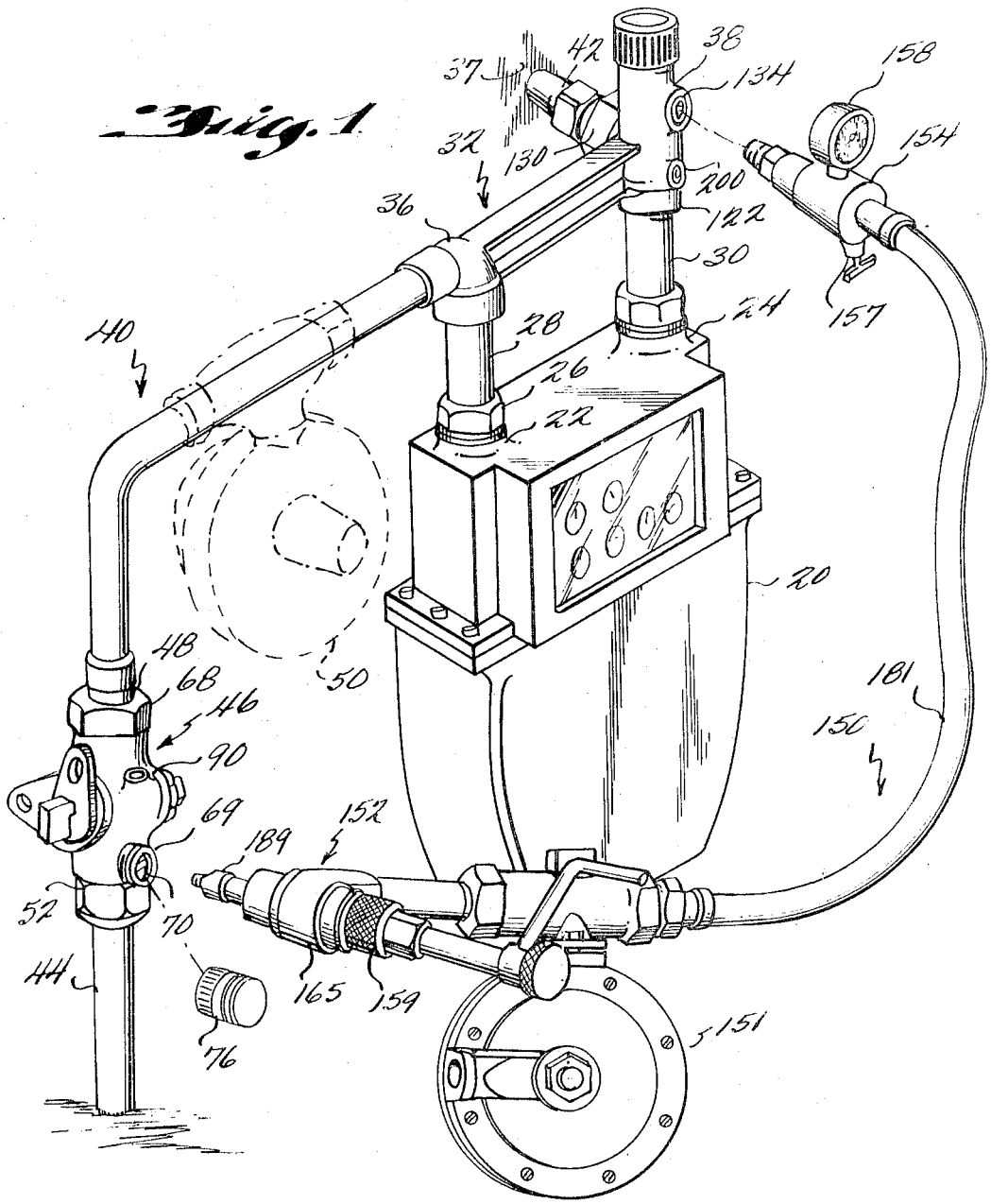

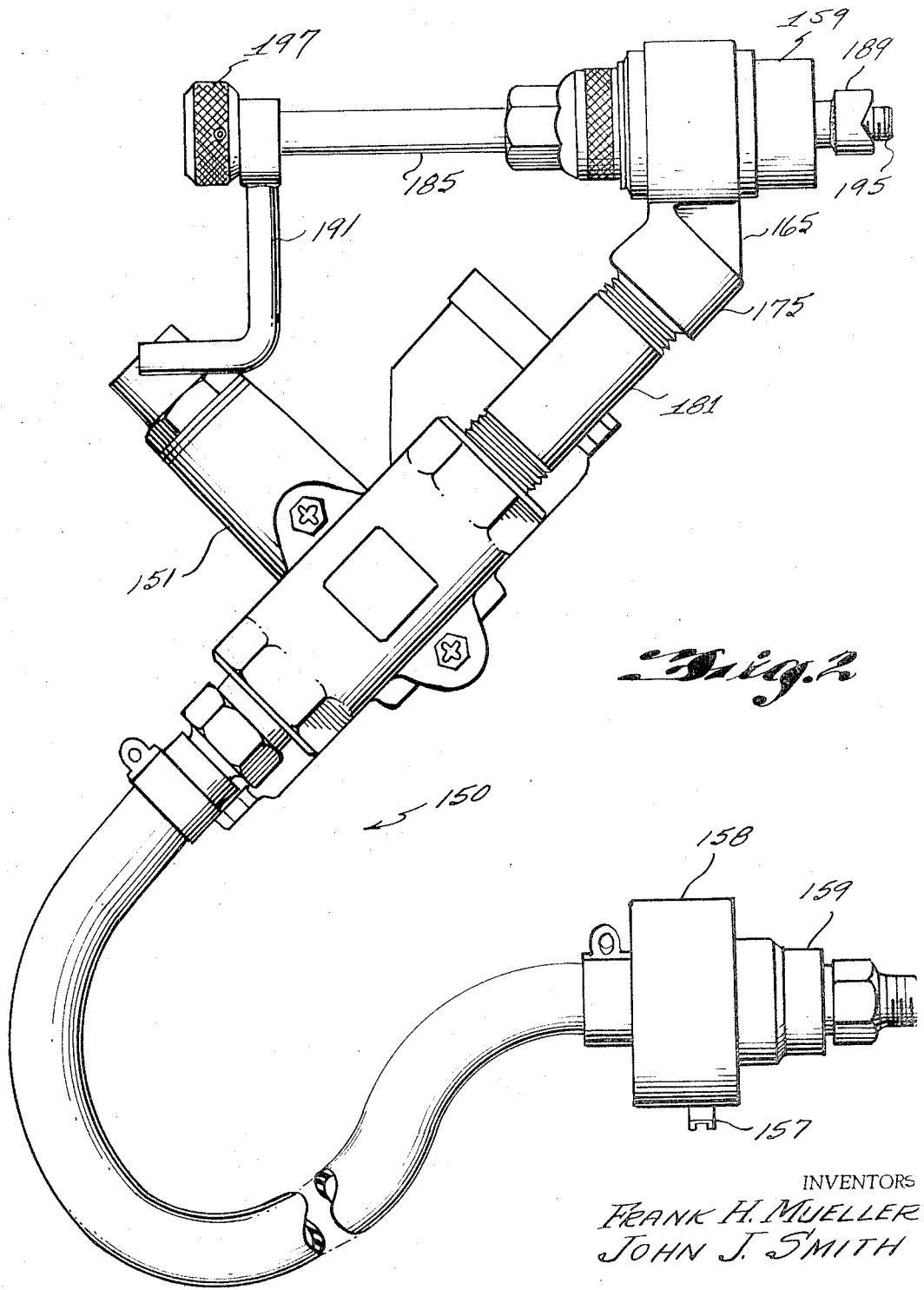

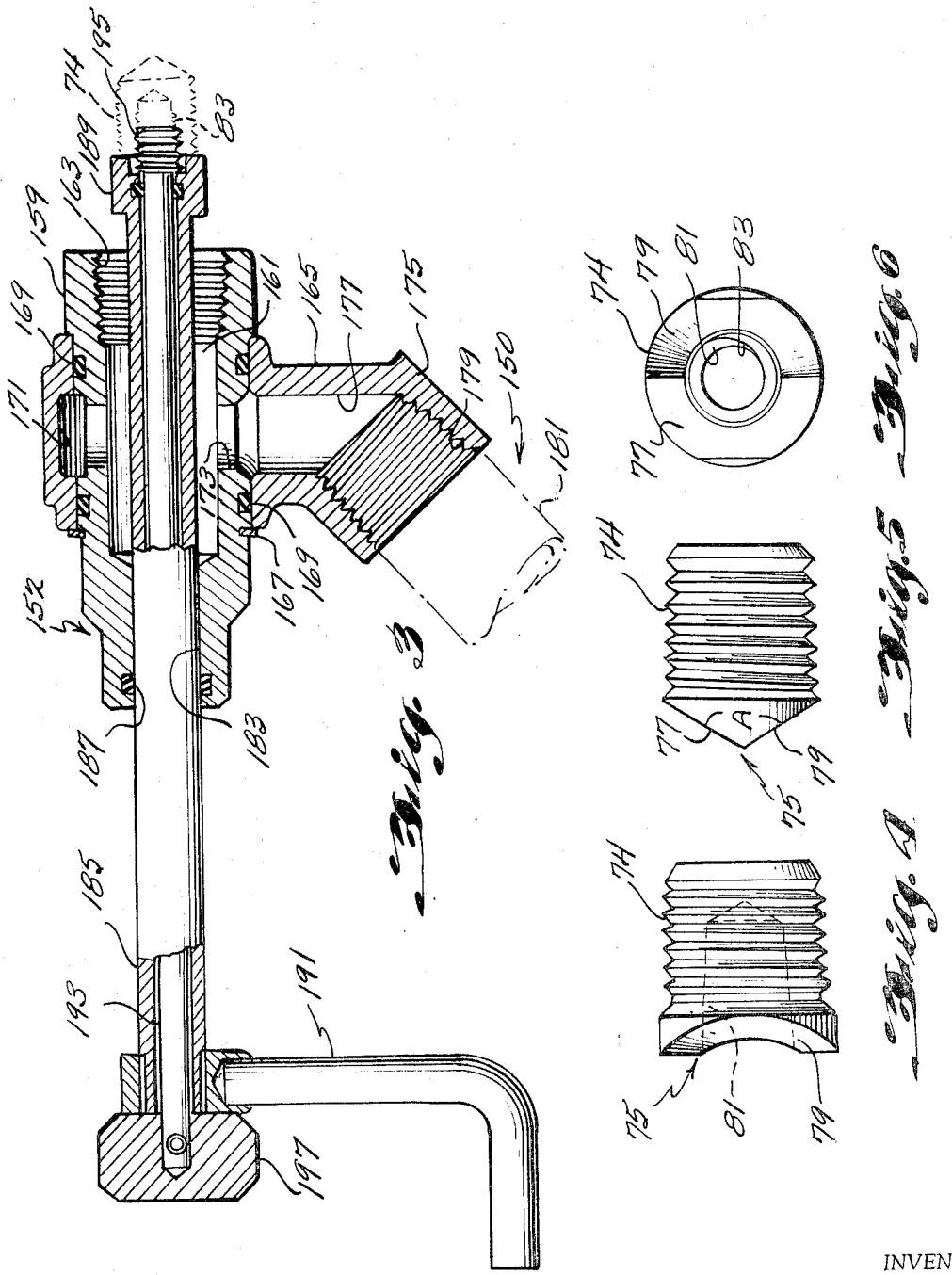

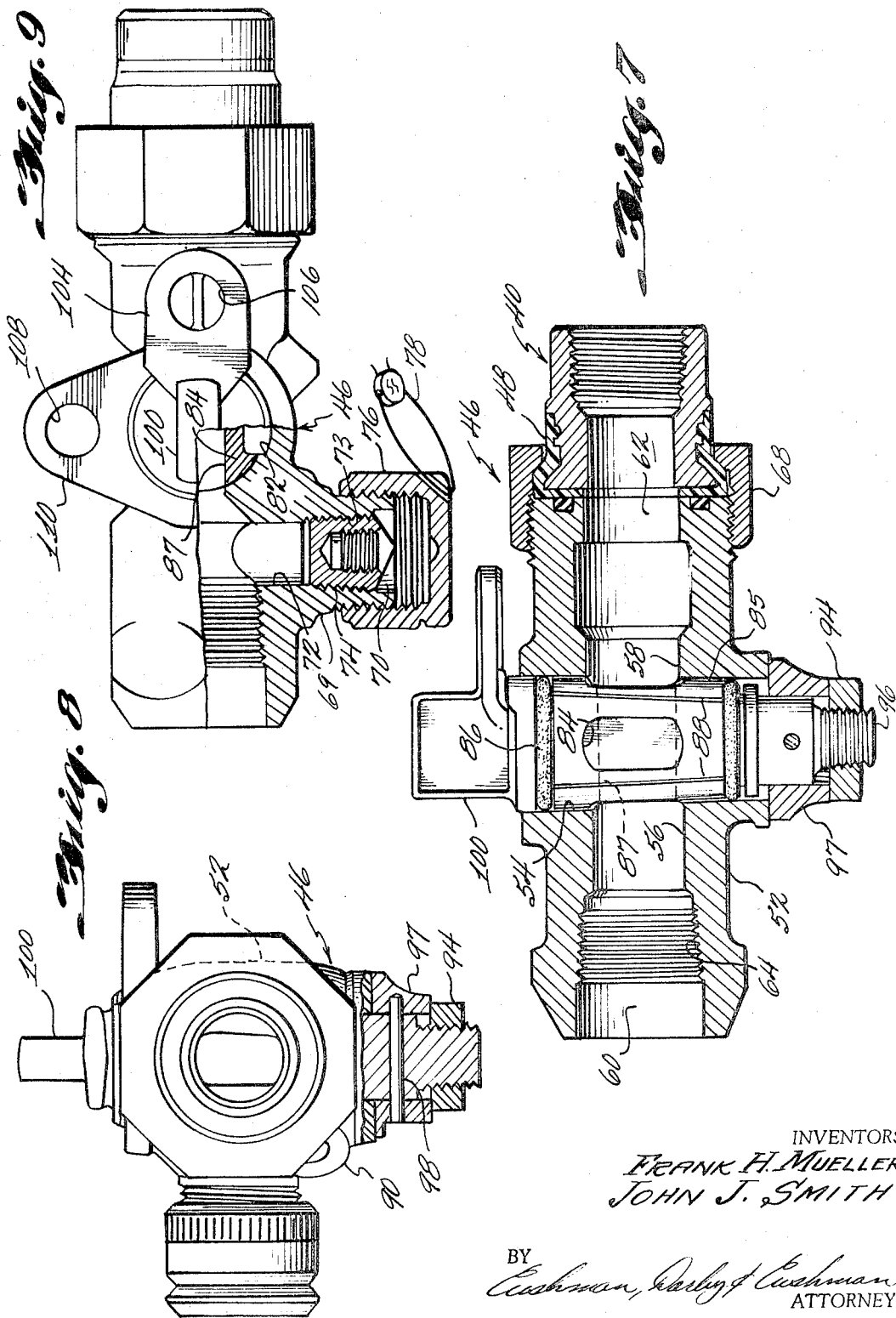

3,296,861
BY-PASS TYPE METER SETTING
Frank H. Mueller and John J. Smith, Decatur, Ill., assignors to Mueller Co., Decatur, Ill., a corporation of Illinois
Filed Dec. 17, 1963, Ser. No. 331,212
19 Claims. (Cl. 73—201)

The present invention relates to a by-pass type meter installation or setting and more particularly to an improved arrangement wherein a fluid meter can be removed from a fluid service line, such as a gas line, without interrupting service. Ancillary, the invention relates to an improved arrangement for connecting a by-pass line to a by-pass port in a by-pass fitting, the improved arrangement eliminating the use of special tools and simplifying the operation of connecting the by-pass line to the by-pass fitting.

It is an established practice among many gas utility companies to remove, inspect, clean, repair and replace their gas meters after the latter have been in service for a period of time. Where the meter is a residential gas meter, difficulty is presented to its removal and replacement, in that any stoppage of gas flow will cause pilot lights to be extinguished in gas-operated appliances, such as stoves, refrigerators, hot water heaters, etc. When service is then restored, there is a possibility that the relighting of one or more pilot lights will be forgotten, putting the residence in a dangerous condition. Even if the gas flow is not stopped during the meter replacement, a sudden surge of gas, if permitted, blows out the pilot lights.

Various prior attempts have been made to provide a system for replacing fluid service meters. These prior systems fall short in that they cause the interruption of fluid service or a fluid surge at some time during the replacement, require a number of expensive special parts, are too cumbersome and difficult to operate, or are of such inflexibility that they will not fit and therefore cannot be employed in confined areas.

It is, therefore, an object of the present invention to provide an improved by-pass type meter setting in which a fluid meter can be removed from a fluid service line without interrupting service.

It is another object of the present invention to provide an improved by-pass type meter setting wherein a fluid meter can be removed from a fluid service line and replaced with the same or a separate meter without interruption of service and without causing a fluid surge in the line.

Yet another object of the present invention is to provide a by-pass type meter setting which can be employed in confined areas.

A further object of the present invention is to provide a by-pass type meter setting that can be operated by persons of limited skill with a minimum of instruction.

It is another object of the present invention to provide a by-pass type meter setting that can be operated without using special tools.

It is another object of the present invention to provide a by-pass type meter setting that is substantially tamper-proof.

Yet another object of the present invention is to provide a by-pass type meter setting that is simple in construction with resulting economies of manufacture and installation.

It is a further object of the present invention to provide an improved by-pass type meter setting in which the by-pass line includes means for removing a tamper-proof plug from a by-pass port in a by-pass fitting.

It is another object of the present invention to provide an improved type of tamper-proof plug for a by-pass fitting.

Ancillary to the immediately preceding object it is a further object of the present invention to provide an improved by-pass line incorporating a tool for removing a tamper-proof plug from a by-pass fitting after the by-pass line has been connected to the fitting.

Still another object of the present invention is to provide a by-pass type meter setting in which the by-pass line is provided with means for determining the pressure of the same so that it can be observed whether or not fluid pressure has been maintained throughout the complete servicing operation of a gas meter.

These and other objects and advantages of the present invention will be more clearly understood from the following detailed specification, claims and drawings in which:

FIGURE 1 is a perspective view of a meter setting embodying the present invention;

FIGURE 2 is an elevational view of the by-pass line illustrated in FIGURE 1;

FIGURE 3 is a sectional view partly in elevation and illustrating the end of the by-pass line adapted for connection to the by-pass fitting having the tamper-proof plug;

FIGURE 4 is a side elevational view of the tamper-proof plug used in the by-pass fitting disclosed in FIGURE 1;

FIGURE 5 is a view similar to FIGURE 4 but with the plug rotated on its axis 90°;

FIGURE 6 is an end view of the plug looking from the left of FIGURE 4;

FIGURE 7 is a vertical sectional view of the by-pass fitting or meter stop illustrated in FIGURE 1, the valve plug being shown in elevation;

FIGURE 8 is an end view of the by-pass fitting or stop shown in FIGURE 7, parts being shown in section; and FIGURE 9 is a top view of the stop shown in FIGURE 7 with fragmentary portions broken away to show the tamper-proof plug in position recessed within the by-pass port.

Referring now to FIGURE 1 of the drawings, a conventional gas meter 20 has an inlet conduit 22 and an outlet 24 projecting therefrom. The inlet conduit 22 and the outlet conduit 24 are spaced from each other and substantially parallel to each other and are secured as by unions 26 to nipples 28 and 30, respectively, for suspending the same from the meter bar 32. The meter bar 32 may be of the type shown in the copending application of Wilbur R. Leopold, Jr. and John J. Smith, Serial No. 331,213 and filed December 13, 1963, in that it is provided with a bracket (not shown) enabling it to be supported from a vertical wall 37. The meter bar 32 embodies an integral inlet fitting 36 in the form of an elbow and an integral outlet fitting 38 which includes a by-pass valve arrangement as disclosed in the aforementioned Leopold and Smith application, or as disclosed in the copending application of Mueller, Serial No. 229,704, filed October 10, 1962, now United States Patent No. 3,187,570 issued June 8, 1965.

A gas supply line generally indicated at 40 and extending from a source of supply (not shown) is connected to the inlet fitting 36 of the meter bar 32 whereas a service line 42 extending from the wall 37 is connected directly to the outlet fitting 38, the service line supplying gas to the house piping (not shown).

The gas supply line 40 includes a conventional riser pipe 44 into which is connected an improved by-pass fitting or meter stop 46 embodying the present invention. The meter stop 46, as best shown in FIGURES 7 through 9, inclusive, is a rotary plug valve similar to the one disclosed in the U.S. patent to Mueller, No. 2,653,791. The stop 46 is connected to the downstream side of the line 40 by an insulated coupling 48 of the type disclosed in greater detail in the copending application of Bowan et al., Serial No. 860,303, now U.S. Patent No. 3,115,354. If gas is supplied to the supply line 40 under high pressure, such pressure must be lowered before it enters the residence or a commercial building. For this purpose, a conventional pressure regulator or reduction valve 50, shown in dotted lines in FIGURE 1, can be connected into the supply line between the meter stop 46 and the meter bar 32. The meter stop 46, shown in FIGURES 7 to 9, inclusive, is a modification of the lubricating meter stop disclosed in the aforementioned U.S. patent to Mueller, 2,653,791, as well as that shown in the aforementioned copending application of Leopold and Smith. The stop 46 includes a body 52 provided with a tapered valve seat 54 having diametrically aligned inlet and outlet ports 56 and 58 communicating respectively with aligned inlet and outlet passageways 60 and 62. The inlet passageway 60 may be provided with interior threads 64 for connection to the upstream end of the riser pipe 44 while the valve body 52 may be provided with exterior threads for engagement of a coupling nut 68 to connect the outlet passageway 62 with the downstream side of the supply line 40 by the insulated coupling 48, as mentioned above.

As best shown in FIGURES 1 and 9, the body 52 of the stop 46 is provided with a boss 69 upstream of the valve seat 54. The boss 69 is provided with a by-pass port 70 communicating directly with a by-pass passageway 72 in the boss 69, the passageway 72 communicating with the inlet passageway 60. The outer end of the passageway 72 is internally threaded as indicated at 73 and is normally closed by an exteriorly threaded tamper-proof closure plug 74 when the by-pass passageway is not being used. It will be understood that when the by-pass passageway 72 is not being used and the plug 74 is in position closing the same, it will be recessed from the by-pass port 70. A dust cap 76 is threaded onto the external threads of the boss 69, to cover the by-pass port 70, the cap 76 being sealed in position by a seal 78.

The tamper-proof plug 74 is best illustrated in FIGURES 4, 5, and 6. The plug 74 is provided with a wedge-shaped end 75 which is defined by a pair of planar surfaces 77 and 79. The planar surfaces 77 and 79 extend at an angle to a radial plane of the plug and have an included angle A therebetween in the order of 120° so that when the plug is recessed in the passageway 72 it is impossible for a person, other than one having a special tool, to remove the same from the passageway 72. Additionally, the plug 74 is provided with an axial bore 81 in its wedge-shaped end 75, the bore being closed at one end and interiorly threaded as indicated at 83 in FIGURES 3 and 6. The purpose of the threaded bore 81 will appear more fully later in the specification.

Rotatably mounted in the interior of the valve seat 54 is a tapered key or valve plug 85 provided with a diametric passageway 87 shown in dotted lines in FIGURE 7 and alignable with the inlet and outlet seat ports 56 and 58 in the open position of the valve 46 in order to permit flow to then pass through the inlet and outlet passageways 60 and 62 to the gas meter 20. The valve plug 85 is also provided with a false port 84 which registers with a false port 82 in the valve seat 54. The purpose of the false ports 82 and 84 is to eliminate seat and valve plug sealing surfaces that would be exposed to line fluids with the resulting possible corrosion of such surfaces in the valve or stop 46. It will be obvious that when the valve plug 85 is turned 90° from the position shown in FIGURES 7 or 9, the valve 46 will be in a closed position as the passageway 87 will be out of alignment with the passageways 60 and 62. When in this position, there can be no flow of fluid to the meter 20, but there can be flow of fluid to the passageway 72 and therefrom when the tamper proof plug 74 is removed.

As disclosed in greater detail in the aforementioned Mueller Patent No. 2,653,791, the valve plug 85 is preferably provided adjacent its larger and smaller ends with circumferential grooves within which are disposed resilient pressure deformable packing rings 86, illustrated in the drawings as being O-rings, which provide an effective seal between the valve plug and its valve seat 54 adjacent the opposite ends of the latter. Longitudinal lubricant channels 88 extend between and connect the O-ring grooves so as to form therewith a closed lubricant system. Lubricant can be introduced into the system through a radial charging port 90 (FIGURE 8) in the body 52, the port 90 registering with one of the longitudinal grooves 88 with the valve plug 85 in either the open or closed position. The outer end of the charging port 90 is enlarged and interiorly threaded to receive a closure plug (not shown). The valve plug 85 is retained in its valve seat 84 by a nut 94 (FIGURES 7 and 8) engaged with a reduced threaded extension 96 on the smaller end of the plug and bearing against a washer 97 which in turn bears against an annular sealing surface on the body 52 and the smaller end of the valve seat 54. Preferably, the washer 97 is locked to the plug 76 by a retaining pin 98 which extends through one side of the washer, through the extension 96 on the small end of the plug, and into a blind socket in the other side of the washer, in order to render the valve 46 substantially tamper-proof, all as disclosed in greater detail in the aforementioned Mueller patent.

The larger end of the plug 85 is provided with a substantially flat wrench-engageable extension 100 for rotating the plug between the open and closed positions, such extension being aligned with the diametric passageway 87 in the plug so as to provide an exterior indication of the position of such passageway 87. The larger end of the plug 85 is also provided with a radial lock-wing 104 having an aperture 106 therein alignable with a corresponding aperture 108 in a fixed lock-wing 110 on the body 52 in the closed position of the valve so as to permit the insertion of a locking device such as a padlock (not shown) through both such apertures in order to lock the valve 46 in its closed position. The valve body 52 can also be provided with projections (not shown) which serve as stops to limit rotory movement in the open and closed positions.

The outlet fitting 38 which is integral with the meter bar 32 is provided with an interiorly threaded inlet 122 for connection therein of the nipple 30 leading to the outlet 24 of the meter 20. The outlet fitting 38 is also provided with a lateral outlet 130 which is adapted to be connected to the service line 42 leading to the house piping. Additionally, the outlet fitting 38 is provided with a by-pass port 134 normally closed by a detachable closure (not shown). Within the outlet fitting 38 there is provided a spool valve of the type disclosed in the copending application of Leopold and Smith, as well as in the Mueller application, Serial No. 229,704, filed October 10, 1962, which is operable between an open position wherein fluid can flow from the meter to the service line 42 and to a closed position where fluid can flow through the by-pass port 134 to the service line 42 with flow from the meter being blocked. When the spool valve is intermediate the open and closed positions, there can be flow both from the meter 20 and the by-pass port 134 to the service line 42. A detailed description of the operation of the spool valve within the outlet fitting 38 will not be given herein as such a valve is disclosed fully in the copending applications of Leopold and Smith, and Mueller, respectively.

As best shown in FIGURES 1, 2, and 3, the by-pass meter setting of the present invention is provided with a flexible by-pass line generally designated at 150, the by-pass line being adapted to be connected to the boss 69 and to the by-pass port 134. In more detail, the by-pass line contains at its upstream end a plug removing tool generally indicated at 152 and at its downstream end with a fitting 154 for connection to the by-pass port 134 in the outlet fitting 38. A pressure regulation 151 may be provided in the by-pass line 150 if the gas supply line 40 is under high pressure and the regulator 50 is required. The fitting 154 is provided with a bleed valve 157 and with a pressure gauge 158. The pressure gauge 158 will register the pressure within the line 150 whenever the line is connected to the by-pass ports 70 and 134 so that the operator may have a ready indication of the pressure in the by-pass setting at all times during the operation of repair or replacement of the meter 20.

The tool 152 in the upstream end of the by-pass line 150 comprises a collar 159 having an enlarged bore 161 therein interiorly threaded as indicated at 163. The collar 159 is adapted to be threaded onto the exterior threads of the boss 70. Collar 159 is provided with a swivel fitting 165 retained thereon on a lock ring 167. O-rings 169 provide a seal between the swivel fitting 165 and collar 159. An annular groove 171 on the interior wall of the swivel fitting 165 communicates with lateral passageways 173 in the collar, the passageways 173 communicating with the enlarged bore 161. The swivel fitting 165 is provided with an offset portion 175 having a passageway 177 therein, communicating with the groove 171, the passageway 177 being interiorly threaded at 179 for reception of a threaded coupling on a flexible hose 181 of the by-pass line 150.

Collar 159 is provided with a bore 183 of reduced diameter as compared to the enlarged bore 161, the bore 183 being axially aligned with and communicating with the enlarged bore 161. Bore 183 slidably receives a tubular shaft 185. A suitable O-ring 187 is provided in an annular groove in the wall of bore 183 for maintaining a seal with the exterior surface of the shaft 185. The tubular shaft 185 extends through the counterbore into and through the enlarged bore 161 and has on its outer end a fitting 189 which is wedge-shaped and complementary to the wedge-shaped end 75 of the tamper-proof plug 74. A handle 191 is keyed to the other end of the shaft 185 so that the shaft 185 can be rotated within the collar 159. A second shaft 193 is carried within the tubular shaft 185, the shaft 193 extending from both ends of the same. The end of the shaft 193 extending from the end of the shaft 185 having the wedge-shaped fitting 189 therein is exteriorly threaded as indicated at 195 whereas the other end of the shaft 193 is provided with a knurled knob or handle 197 so that the shaft 193 can be rotated relative to the shaft 185. It will now be obvious that the tubular shaft 185 and the shaft 193 will be slid axially in the collar 159 as a unit, but cannot be moved axially relative to one another.

When it is desirous to use the installation for by-passing purposes, with the meter stop 46 in its open position, the by-pass line is connected, respectively, to the boss 69 and to the by-pass port 134. Of course, the cap 76 on the boss 69 is first removed. When line 150 is connected, the stop 46 is in its open position, i.e., that is the position wherein gas flows from the riser pipe 44 through the supply line 40 to the meter 20, whereas the valve in the outlet fitting 38 is in the position where flow is from the meter through the nipple 30 to the service pipe 42 with the by-pass port 134 blocked. After the by-pass line 150 has been connected as described above, then it is necessary to remove the tamper-proof plug 74 from the by-pass passageway 72 so that there can be a flow of gas into the bore 161 and through the by-pass line 150.

The removal of the plug 74 is accomplished by first threading the end 195 of the shaft 193 into the threaded axial bore of the plug 74 until the wedge-shaped end 189 is in tight mating engagement with the wedge-shaped end 75 of the plug 74. When this has occurred, there can be no axial movement between the plug 74 and the end 189 of shaft 185, and, thus, the handle 191 is rotated in a direction such that the plug can be withdrawn from the by-pass passageway 72 through the by-pass port 70 into the enlarged bore 161 in the collar 159. Gas can then flow through the by-pass port 70 into the line 150 up to the outlet fitting 38. The bleed valve 157 is opened just prior to removal of the plug 74 so that as gas flows to the fitting 38, and air in the line 150 is expelled to atmosphere after air is expelled from the line 150, the bleed valve 157 is closed and the operator can then observe the gauge 158 to make sure that pressure in the line has reached a predetermined desired pressure. The valve in the outlet fitting 38 is then moved from its first position to the intermediate position where there can be a flow of gas both through the meter 20 to the service line 42 and through the by-pass line 150 to the service line 42. After the valve in the outlet 38 has been moved to the intermediate position and it is determined that gas under pressure is flowing throug the line 150 to the service pipe 42, the valve in the outlet setting 38 is then moved to the position where it blocks flow from the meter 20 and permits only flow from the by-pass line 150 to the service pipe 42.

Then the stop 46 is moved to its fully closed position to block flow of gas from the riser 44 to the meter 20 and then the meter is removed from the meter bar 32 and repaired or replaced. During the entire operation mentioned above, the operator has constant indication of the pressure in the line 150 and thus if he notes the pressure dropping below a predetermined amount, he will know that it is necessary to relight pilot lights in the dwelling. However, this is usually not necessary as the changeover accomplished as described above avoids any pressure surges or pressure drops to the service pipe 42.

After the meter 20 has been repaired and it, or a new meter, has been reconnected to the meter bar 32, service through the meter is re-established by following substantially the reverse procedure. However, in re-establishing service, it is necessary to purge air from the supply line 40 upstream from the stop 46 and from the meter 20 and this is accomplished by opening a bleed (200) on the outlet fitting 38 in the manner described fully in the Mueller copending application, Serial No. 229,704, or in the copending Leopold and Smith application, Serial No. 331,213.

It will thus be seen that the objects of this invention have been fully and effectively accomplished by the by-pass type meter setting described above and illustrated in the drawings. However, it will be realized that the foregoing specific embodiments have been shown and described only for the purposes of illustrating the principles of this invention and are subject to extensive changes without departure from such principles. Therefore, the terminology used throughout the specification is for the purposes of description and not limitation, the scope of the invention being defined in the claims.

What is claimed is:

1. A by-pass type meter setting: a fluid line; a fluid meter detachably connected into said line; a first valve connected into said line upstream of said meter and having at least two positions, an open position wherein flow takes place therethrough to said meter and a closed position wherein flow from the upstream side of said line to said meter is blocked; means in said line upstream of said valve including a by-pass port, and a plug threadedly received in said by-pass port and closing the same to the flow of fluid therethrough; a second valve connected to said line downstream of said meter and having a body provided with a by-pass port, said second valve having at least two positions, an open position wherein flow takes place therethrough from said meter and flow from said port is blocked and a by-pass position wherein flow takes place from said port to the downstream side of said line and flow from said meter is blocked; and a by-pass line detachably connected to and between said by-pass ports said by-pass line including means therein at its upstream end thereof for removing the plug from the by-pass port in said means upstream of said first valve after said by-pass line is connected to said port.

2. The structure defined in claim 1 in which said plug in said by-pass port includes an outwardly facing wedge-shaped end and in which said means in said by-pass line includes a rotatable tool having a wedge-shaped end complementary to the wedge-shaped end of said plug, said rotatable tool being engageable with said plug for unthreading the same from said by-pass port when the upstream end of the by-pass line is connected to said by-pass port.

3. The structure claimed in claim 1 in which said plug in said by-pass port is provided with an outwardly facing wedge-shaped end having an axial bore therein closed at one end thereof and interiorly threaded, and in which said means in the upstream end of said by-pass includes a coupling shaft having its end exteriorly threaded and being threadedly received within the bore of said plug and a tubular shaft concentric of said coupling shaft and rotatable relative thereto, said tubular shaft being provided with a wedge shape end for mating with the wedge-shaped end of said plug when said coupling shaft is threaded into said plug.

4. The structure of claim 3 in which said wedge-shape end of said plug has an included angle in the order of 120° between its surfaces.

5. The structure defined in claim 1 including a pressure gauge on said by-pass line at the downstream end thereof for determining pressure in said line during by-pass operation.

6. The structure defined in claim 1 in which said means in said by-pass line in the upstream end thereof for removing the plug from said by-pass port includes a tool having a wedge-shaped end and in which said plug has a wedge-shaped end for the mating with the wedge-shaped end of said tool whereby said tool can unthread and thread the same, and in which said by-pass line includes a pressure gauge in the downstream end for indicating pressure of fluid in said line after said plug has been removed from said by-pass port.

7. A by-pass type meter setting: a fluid line; a fluid meter detachably connected into said line; a first valve connected into said line upstream of said meter, said valve including a body provided with a circular valve seat intersected by diametrically aligned inlet and outlet passageways, a valve plug rotatable in said seat and having a passageway alignable with said inlet and outlet passageways in a first open position of the valve to permit flow to said meter and said valve plug blocking flow to said meter when the passage therein is out of alignment with said diametrically aligned inlet and outlet passageways; a boss on said valve body upstream of said valve plug and having a by-pass port communicating with said outlet passageway, said boss being exteriorly threaded and interiorly threaded in said by-pass port; a plug threadably received in said by-pass port of said boss and closing the same to the flow of fluid therethrough; a second valve connected to said line downstream of said meter and having a body provided with a by-pass port, said second valve having at least two positions, an open position wherein flow takes place therethrough from said meter and flow from said port is blocked and a by-pass position wherein flow takes place from said port to the downstream side of said line and flow from said meter is blocked; and a by-pass line threadably connected to the boss of said first valve and to the by-pass port of said second valve, said by-pass line having a tool in its upstream end for removing the plug from the by-pass port of said boss after the by-pass line has been threaded onto said boss.

8. The structure as claimed in claim 7 in which said tool includes a collar having an enlarged bore therein with interior threads thereon for threadably receiving the exterior threads of said boss, a tubular shaft rotatably supported in said collar and extending through said bore, said shaft having a wedge-shaped end, a second shaft rotatably carried within said tubular shaft and extending from the wedge-shaped end thereof and being threaded, said second shaft being fixed axially with respect to said first shaft and rotatable with respect to said first shaft and in which said plug in said boss is provided with an outwardly facing wedge-shaped end complementary to the wedge-shaped end of said tubular shaft, said plug also having an axial bore in its wedge-shaped end threaded to receive the threaded end of said second shaft.

9. The structure defined in claim 8 in which a swivel fitting is provided on said collar, said fitting having an annular groove therein and said collar having a lateral passageway therein communicating with said groove, said fitting further having a passageway therein communicating with the by-pass line.

10. The structure defined in claim 8 in which said tubular shaft and said second shaft are slidable relative to said collar and in which said tubular shaft and said second shaft are each provided with handle means for rotating the same relative to one another.

11. The structure defined in claim 8 including a pressure gauge on said by-pass line at the downstream end thereof for indicating pressure within said line at all times.

12. The structure defined in claim 8 in which said wedge-shaped end of said plug and said wedge-shaped end of said tubular shaft each have an inclined angle in the order of 120° between their surfaces.

13. A by-pass fitting for a fluid line comprising: a body member provided with a through bore having an inlet end and an outlet end, said body member having a boss thereon with a by-pass port communicating with the bore, said by-pass bore being interiorly threaded, a tamper proof closure plug having exterior threads thereon, said tamper proof closure plug being threadably received by the interior threads of said by-pass port, said closure plug having an outwardly facing wedge-shaped driving end defined by intersecting planar surfaces for cooperating with a tool having a complementary wedge-shaped driving end, and said closure plug having an axial bore therein opening at least to the wedge-shaped end, said axial bore having interior threads for receiving a threaded means on the tool whereby said wedge-shaped driving end of said plug and the wedge-shaped driving end of the tool are retained in driving connection.

14. The structure defined in claim 13 wherein the included angle between said planar surfaces of said plug is in the order of 120°.

15. The structure defined in claim 13 in which said axial bore is closed at one end and in which said planar surfaces have an included angle therebetween in the order of 120°.

16. A by-pass fitting for a fluid line comprising: a body member provided with a through bore having an inlet and an outlet end, said body member having a boss thereon with a by-pass port communicating with the bore, said by-pass port being interiorly threaded, a tamper proof closure plug having exterior threads thereon, said tamper proof plug being threadably received by the interior threads of said by-pass port, said closure plug having an outwardly faced wedge-shaped end defined by intersecting planar surfaces, said closure plug further having an axial bore therein opening at least to the wedge-shaped end, said axial bore having interior threads, and in which said boss has exterior threads, a by-pass line threadably connected to said boss, said by-pass line having a tool in its end connected to the boss for removing said tamper-proof closure plug from the by-pass port after the by-pass line has been threaded onto the boss.

17. The structure as claimed in claim 16 in which said tool in the end of said by-pass line includes a collar having an enlarged bore therein with interior threads thereon for threadably receiving the exterior threads of the boss, a tubular shaft slidably supported in said collar and extending through the enlarged bore in said collar, said tubular shaft having a wedge-shaped end defined by intersecting planes and complementary to the wedge-shaped end of said tamper-proof plug, a second shaft rotatably carried within said tubular shaft and extending from the wedge-shaped end thereof, said second shaft being fixed axially with respect to said first shaft and rotatable relative to said first shaft, means on said second shaft cooperating with said tamper-proof plug for retaining the wedge-shaped end of said first shaft in tight engagement with the wedge-shaped end of said plug.

18. The structure defined in claim 17 wherein said last-mentioned means includes exterior threads provided on the end of said second shaft, said threads on the end of said second shaft being received by the interior threads of the axial bore in the wedge-shaped end of said plug.

19. The structure defined in claim 17 including a swivel fitting provided on said collar, said fitting having an internal annular groove therein, said collar having a lateral passageway therein communicating with said groove, said swivel fitting further having a passageway therein communicating with and forming a part of the by-pass line.

References Cited by the Examiner
UNITED STATES PATENTS

| | | | |
|---|---|---|---|
| Re. 7,124 | 5/1876 | Nunn | 85—45 X |
| 1,007,107 | 10/1911 | Hullsmann | 85—45 X |
| 1,777,936 | 10/1930 | Roberts. | |
| 1,963,234 | 6/1934 | Harrison | 85—45 X |
| 2,579,656 | 12/1951 | Douglas et al. | 137—599.1 X |
| 2,845,952 | 8/1958 | Hill | 138—89 |
| 3,148,708 | 9/1964 | Panella | 138—89 |
| 3,157,203 | 11/1964 | VerNooy | 138—89 |
| 3,173,295 | 3/1965 | Magleby | 73—201 |
| 3,187,570 | 6/1965 | Mueller | 73—201 |

RICHARD C. QUEISSER, *Primary Examiner.*

E. D. GILHOOLY, *Assistant Examiner.*